US006609140B1

(12) United States Patent
Greene (10) Patent No.: US 6,609,140 B1
(45) Date of Patent: Aug. 19, 2003

(54) METHODS AND APPARATUS FOR FAST FOURIER TRANSFORMS

(75) Inventor: Jonathan E. Greene, Great Barrington, MA (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 253 days.

(21) Appl. No.: 09/728,469

(22) Filed: Nov. 30, 2000

Related U.S. Application Data

(60) Provisional application No. 60/192,639, filed on Mar. 27, 2000, and provisional application No. 60/168,027, filed on Nov. 30, 1999.

(51) Int. Cl.[7] .............................................. G06F 15/00
(52) U.S. Cl. ...................................................... 708/404
(58) Field of Search ................................ 708/400, 403, 708/404, 405, 406, 408, 409

(56) References Cited

U.S. PATENT DOCUMENTS

| | | | |
|---|---|---|---|
| 4,612,626 A | | 9/1986 | Marchant |
| 4,868,776 A | | 9/1989 | Gray et al. |
| 4,977,533 A | | 12/1990 | Miyabayashi et al. |
| 5,303,172 A | | 4/1994 | Magar et al. |
| 5,430,667 A | * | 7/1995 | Takano ....................... 708/404 |
| 5,473,556 A | | 12/1995 | Aguilar et al. |
| 5,751,616 A | * | 5/1998 | Hegland et al. ............ 708/401 |
| 5,835,392 A | | 11/1998 | Dulong et al. |
| 6,006,245 A | | 12/1999 | Thayer |
| 6,088,714 A | | 7/2000 | Wadleigh |
| 6,230,177 B1 | | 5/2001 | Gossett et al. |
| 6,356,926 B1 | * | 3/2002 | Andre ........................ 708/404 |
| 6,421,696 B1 | | 7/2002 | Horton |
| 6,430,587 B1 | | 8/2002 | Örling |

* cited by examiner

Primary Examiner—Chuong Dinh Ngo
(74) Attorney, Agent, or Firm—David J. Powsner; Ronald E. Cahill; Nutter McClennen & Fish LLP (57) ABSTRACT

A system for calculating fast Fourier transforms includes a non-final stage calculating means for repetitively performing in-place butterfly calculations for n–1 stages as well as a final stage calculating means for performing a final stage of butterfly calculations. The final stage calculating means includes a first loop and a second loop. The first loop performs a portion of the final stage butterfly calculations by iterating on a table of first loop index values consisting of values that bit-reverse into themselves. The first loop also includes control logic to select inputs for groups of butterfly calculations based on the first loop index values. The second loop performs a remaining portion of the final stage butterfly calculations by iterating on a table of second loop index value pairs consisting of two values that bit-reverse into each other. The second loop includes control logic to select inputs for two groups of butterfly calculations based on the two second loop index pair values respectively.

46 Claims, 4 Drawing Sheets

METHODS AND APPARATUS FOR FAST FOURIER TRANSFORMS

RELATED APPLICATIONS

This application claims priority from U.S. Patent Application Serial No. 60/168,027, filed Nov. 30, 1999, and No. 60/192,639, filed Mar. 27, 2000, both of which are hereby incorporated by reference.

BACKGROUND

Fast Fourier transforms (FATS) are a set of algorithms for computing discrete Fourier transforms (DOTS). The discrete Fourier transform is the central computation in many spectral analysis problems that are encountered in signal processing. For example, in speech recognition, spectral analysis is usually the first, or at least an early, step in processing an acoustic signal to discern words or word components. In sonar systems, sophisticated spectrum analysis is required for the location of surface vessels and submarines. In radar systems, obtaining target velocity information generally involves the measurement of spectra. Fast Fourier transforms can in some cases reduce the computational time required to compute discrete Fourier transforms by a factor of 100 or more.

In general, FATS operate by breaking an original N-point sequence into shorter sequences, the DFTs of which can be combined to give the DFT of the original N-point sequence. Because a direct evaluation of an N-point DFT requires $(N-1)^2$ complex multiplications and $N(N-1)$ complex additions, breaking down the calculation into smaller units results in a significant time savings, even in light of the further steps required to combine the results of the smaller DFT calculations.

The basic calculating operation in most FFT algorithms is the so-called "butterfly." A butterfly is a complex adder-subtractor operation that has the same number of inputs as outputs. The number of inputs, which corresponds to the level of decomposition of the DFT, is sometimes referred to as the "radix." Thus, a radix-4 calculation will have four inputs to, and four outputs from, each butterfly. Taking the example of a 256-point DFT calculation, the DFT may be broken into 64 4-point DFTs which may be combined using 64 (N/4) butterflies in each of 4 ($\log_4(N)$) stages, making a total of 4 stages in the FFT including the 4-point DFT calculations. Combining multiplications are also applied at each butterfly. The multipliers employed are referred to as "twiddle factors" or sometimes as phase or rotation factors.

One important aspect of the butterfly structure is that, because the operation has the same number of inputs as outputs, intermediate stage FFT calculations require no additional memory allocation (except of course for the twiddle factors) during calculation because the outputs of the butterfly can be written back to memory at the same location that the inputs were taken from. An FFT algorithm that uses the same locations to store both the input and output sequences is called an in-place algorithm.

The order of the inputs to, and outputs from, an FFT calculation is important because typical FFT algorithms result in the outputs being in "bit-reversed" order from the inputs. While algorithms for reordering the outputs to be in natural order (or reordering the inputs to be in bit reversed order) are known in the art, additional processing steps must be employed to perform the reordering. Because FATS are often calculated many at a time, processing time could be meaningfully reduced if an improved ordering scheme could be applied.

In addition, the processing of FFT algorithms can be improved by employing vector processors. Traditionally, many high-performance computational devices for processing spectra have included a combination of a single microprocessor controlling system functions with off-chip devices, such as DSP (digital signal processor) farms or custom ASICs (application specific integrated circuits) to perform specialized computations. More recently, array or vector processors have been employed to address high-bandwidth data processing and algorithmic-intensive computations in a single chip. In one common type of array processor, the SIMD ("single instruction, multiple data) processor, a single instruction operates on a vector having multiple values rather than on a single value in a register. One exemplary SIMD processor is the PowerPC™ G4™ processor having AltiVec™ technology. FFT algorithms, however, must be improved upon to take full advantage of the promise offered by vector processing systems.

SUMMARY OF THE INVENTION

The methods and apparatus of the invention improve on existing FFT calculations by providing a multistage FFT calculation in which the final stage is characterized by two processing loops that store the outputs of butterfly calculations in a shuffled order that results in the FFT outputs being correctly ordered with no need to perform an additional bit-reversal ordering pass. In one embodiment, the invention provides a system for performing a fast Fourier transform on N ordered inputs in n stages. The system includes a non-final stage calculating section that repetitively performs in-place butterfly calculations for n–1 stages, as well as a final stage calculating section that performs a final stage of butterfly calculations.

The final stage calculating section executes a first loop and a second loop. The first loop performs a portion of the final stage butterfly calculations by iterating on a table of first loop index values consisting of values that bit-reverse into themselves. The first loop also executes control logic to select inputs for groups of butterfly calculations based on the first loop index values, to perform the groups of butterfly calculations, and to store the butterfly calculation outputs in shuffled order in place of the selected inputs to result in a correct ordering of transform outputs.

The second loop performs the remaining portion of the final stage butterfly calculations by iterating on a table of second loop index value pairs, where each pair consists of two values that bit-reverse into each other. The second loop executes control logic to select inputs for two groups of butterfly calculations based on the two second loop index pair values respectively, to perform the two groups of butterfly calculations, and to store the butterfly calculation outputs from one of the two groups butterfly calculations in shuffled order in place of the inputs selected for the other of the two groups of butterfly calculations and vice versa.

In more specific embodiments, N is a power of two and in the final calculating stage, calculations are carried out as radix-4 butterflies. The system of the invention can also be a computer system having a four-fold SIMD processor wherein the butterfly calculations are carried out as four simultaneous radix-4 butterflies.

Where radix-4 butterflies are performed in groups of four, a specific shuffling order can be employed by representing the inputs and outputs for the four radix-4 butterflies as 4×4 matrices. In this scenario, the first loop iterates through a list of first loop index values between 0 and N/16–1 that bit reverse into themselves. Control logic executed by the first loop selects four groups of four consecutive inputs by transforming the first loop index value into four input indices by multiplying the first loop index value by four, and successively adding N/4 to result in four input indices. Each group of four consecutive inputs is then selected beginning with one input index. Four radix-4 butterfly calculations, one calculation for each group of four inputs, are performed and the outputs are stored in place of the inputs in shuffled order. The shuffled order results from a 4×4 matrix transposition and subsequent swapping of two inner columns.

Following this same scenario, the second loop iterates through a list of second loop index pair values which includes pairs of values between 0 and n/16−1 that bit-reverse into each other. In the second loop, two sets of four groups of four consecutive inputs are selected by transforming each value in the second loop index pair into four input indices and selecting four consecutive inputs at each input index as in the first loop. Two sets of four radix-4 butterfly calculations are then performed and the outputs are stored in place of each other (one set's outputs over the other set's inputs and vice versa) using the same shuffling of order used in the first loop.

BRIEF DESCRIPTION OF THE DRAWINGS

The invention will be more fully understood from the following detailed description taken in conjunction with the accompanying drawings, in which like reference numerals designate like parts throughout the figures, and wherein.

DETAILED DESCRIPTION OF THE INVENTION

Figure 1:
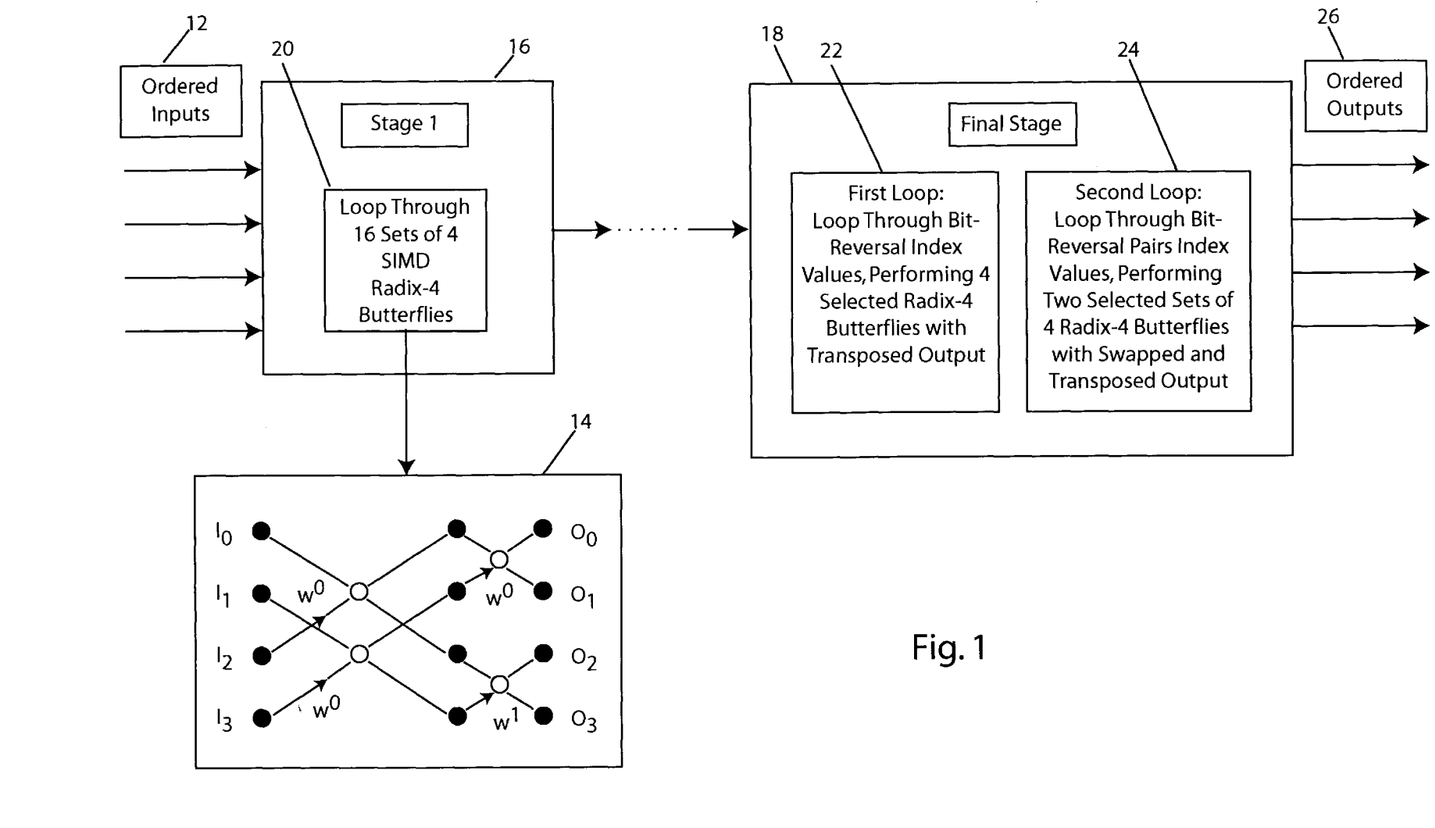
FIG. 1 illustrates a fast Fourier transform method of the invention.

FIG. 1 illustrates an exemplary Fast Fourier Transform (FFT) method of the invention for calculating the Fourier Transform of a complex sequence of length N. While the example of FIG. 1 is described for a 256-point FFT (N=256) with a radix-4 (R=4) decimation-in-time decomposition, a person of ordinary skill in the art will recognize that the invention may be applied to other than this specific calculation. For example, the method of the invention can readily be employed where N is a power of two and N is at least 16. In addition the method may be employed for forward or inverse FFT calculations.

According to FIG. 1, the inputs 12, consisting of N complex "points" to the FFT calculation are provided from computer memory. For SIMD processing, it can be beneficial to store complex inputs 12 in two separate floating point arrays: Re[N], containing the real portion of the sequence, and Im[N], containing the imaginary portion of the sequence. In one example, SIMD registers can be viewed as arrays or vectors containing four floating point values, and SIMD operations can be viewed as four independent operations. In addition, many SIMD architectures provide instructions for loading and storing SIMD registers from consecutive memory locations. Thus, storing inputs 12 in separate floating point arrays having the real and imaginary portions of the sequence allows for straightforward reading of the real and imaginary values into registers where complex additions, subtractions and multiplications can be performed in groups of four without first having to arrange the elements within the SIMD registers. In one embodiment, the method of the invention is carried out on a processor having a four-fold SIMD architecture capable of performing four identical floating point operations at one time and having eight vector registers, each having four floating point values, for a total of 32 floating point registers.

Applied using radix-4 decomposition and a four-fold SIMD architecture, the FFT methodology of the invention uses in-place radix-4 decimation-in-time (DIT) butterflies 14 for each stage 16 except for the last stage 18. It is worth noting that if N is an odd power of two, for example, if N is 128 ($2^7$) or 512 ($2^9$), the first stage 16 can employ radix-8 butterflies and the following stages can employ radix-4 butterflies. Where N does not naturally occur as a power of two, the method of the invention can still be employed by adding additional zero elements to the sequence to cause N (which, as noted above, is the length of the sequence) to be a power of two. Where N=256, each of four stages will have 64 radix-4 butterfly 14 calculations. When four butterflies 14 are performed simultaneously on a four-fold SIMD processor, each stage 16 can loop 20 through the four butterfly 14 calculations 16 times to complete the stage.

For each radix-4 butterfly 14, 4 complex elements are accessed from the input sequence ($I_0$, $I_1$, $I_2$, $I_3$) and mathematically combined with 4 complex exponentials (the twiddle factors, denoted as W) to produce 4 complex output elements ($O_0$, $O_1$, $O_2$, $O_3$). In a given stage 16 of the FFT, every element in the sequence participates in exactly one butterfly 14, and the entire sequence is read once, and written once in-place, per stage. In writing the output elements from each butterfly 14 in-place, the two central output elements (See $O_1$ and $O_2$) in each butterfly are interchanged so as to generate a bit-reversed output for each successive stage. In operation on a four-fold SIMD processor, 32 floating point registers are required for inputs to four simultaneous butterfly 14 calculations as each of the four radix-4 butterfly operations has 4 complex inputs, each consisting of real and imaginary floating point elements.

In the butterfly 14 notation illustrated in FIG. 1 (where one radix-4 butterfly calculation is shown), each open circle represents an adder-subtractor with the sum of the two inputs appearing as the upper output from the open circle and the difference between the inputs appearing as the lower output to the open circle. The arrows represent the complex multiplications using the twiddle factors (denoted as W). Further details of the operation of butterfly evaluations and their role in FFT algorithms in general are readily available in the art, and Rabiner et al., Theory and Application of Digital Signal Processing, Prentice Hall, Inc., Chapter 6 "Spectrum Analysis and the Fast Fourier Transform," pp. 356 to 437 (1975), is hereby incorporated by reference for this purpose.

As is known in the art, in each stage 16 prior to the last, the indices (zero based) of elements that participate in a given radix-4 butterfly 14 are divisible by 4, and the same butterfly calculation (i.e., application of the same twiddle factors) is performed on consecutive elements in groups that are a multiple of 4 elements in size. In each stage 16 prior to the last, elements in consecutive memory locations participate in independent butterflies. In this same way, known algorithms for loading input and twiddle values from memory for SISD (Single Instruction Single Data) processor systems can also be applied on SIMD processor systems.

In the final stage 18, radix-4 butterflies are performed on adjacent elements (i.e., consecutive indices). If the same calculation methodology is applied to the final stage 18 that is employed in earlier stages 16, the output sequence will be in an entirely bit-reversed order, requiring an additional processing loop to reorder the data. In the final stage 18 of the invention, the computation is performed in a first loop 22 and a second loop 24 with a particular ordering of the output elements that results in output sequences 26 being written in natural order without the need for a separate reordering procedure.

Figure 2:
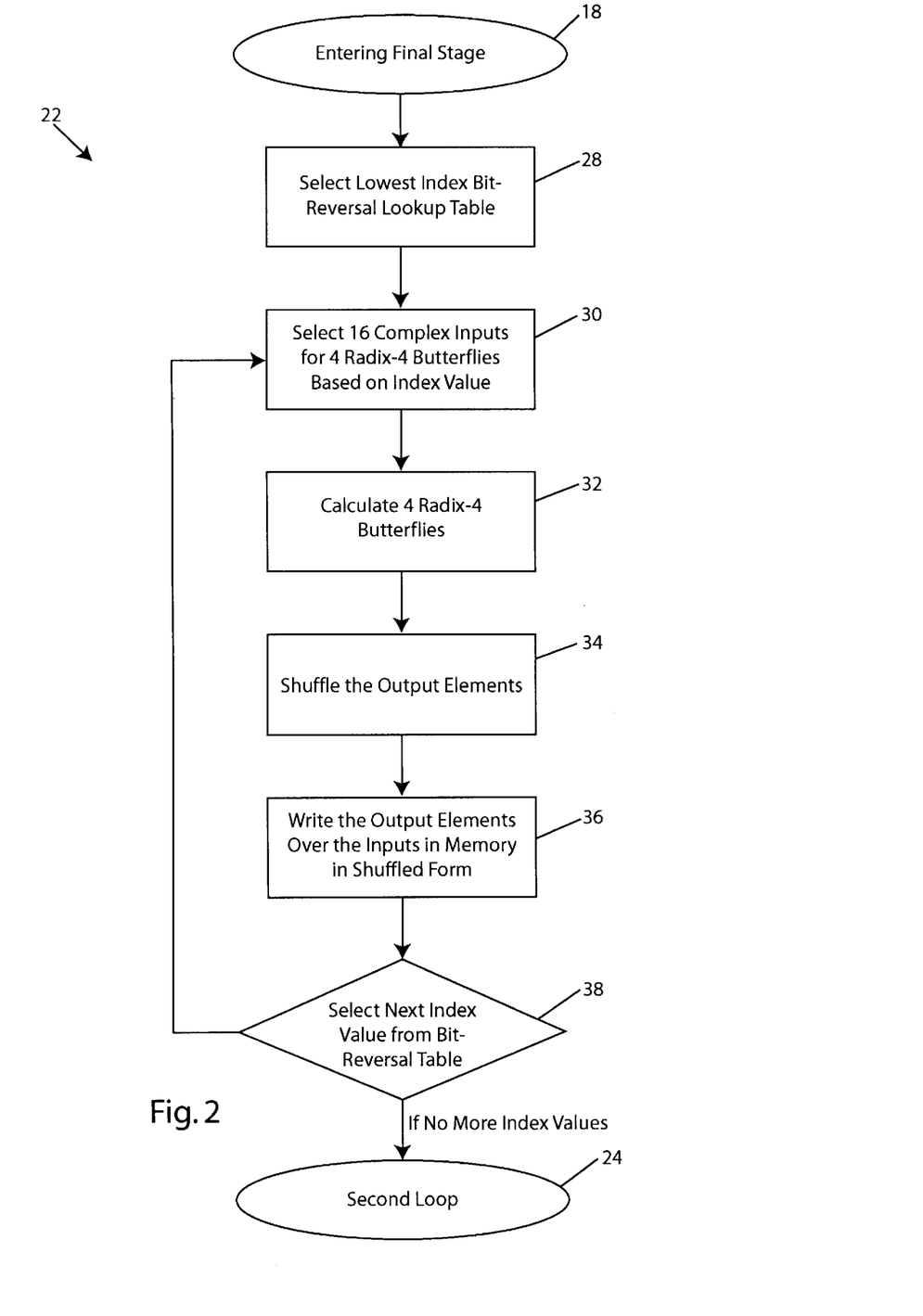
FIG. 2 is a flow chart for a first processing loop in a final calculation stage of the fast Fourier transform method of FIG. 1.

Beginning the first loop 22, illustrated in more detail in FIG. 2, the lowest index value for the input elements to the first butterfly is read from a lookup table 28. For calculating an FFT for a complex sequence having N elements, the lookup table contains index values that are numbers from 0 to N/16−1 that bit-reverse into themselves, multiplied by four. For example, where N=256, the numbers from 0 to N/16−1 that bit-reverse into themselves are 0 (0000), 6 (0110), 9 (1001), and 15 (1111). The values in the lookup table would then be these numbers multiplied by four, or 0, 24, 36, and 60. These values may be stored as 0, 24, 36 and 60, or they may be stored as the bit-reversal numbers themselves as it is relatively inexpensive (in terms of computer resources) to multiply by four, especially where the processor provides instructions for shifting values left by some number of bits (and thereby multiplying by powers of two). In addition, because the first value in the table will generally be 0, the 0 in the lookup table can be replaced with the number of values stored in the table. This information can be valuable in processing the first loop 22 where the FFT method allows for N to vary.

In the first pass through the first loop 22, the lowest value in the lookup table is used to select the inputs for the first four radix-4 butterflies 30. For example, if the index read from the table is the value j, the indices for the four input elements to the first radix-4 butterfly will elements j, j+1, j+2, and j+3. For the other three radix-4 butterflies that are simultaneously calculated the four-fold SIMD processor, the lowest indices for the input elements to the butterfly calculation are M=N/4 indices apart. Accordingly, the inputs to the second butterfly will have indices j+M, j+1+M, j+2+M, and j+3+M; the third butterfly j+2M, j+1+2M, j+2+2M, and j+3+2M; and the fourth butterfly j+3M, j+1+3M, j+2+3M, and j+3+3M. Where N=256 and the index value is 0, the indices for the 16 complex inputs are 0, 1, 2, 3, 64, 65, 66, 67, 128, 129, 130, 131, 192, 193, 194, and 195. Four radix-4 butterflies are then calculated 32.

Figure 3:
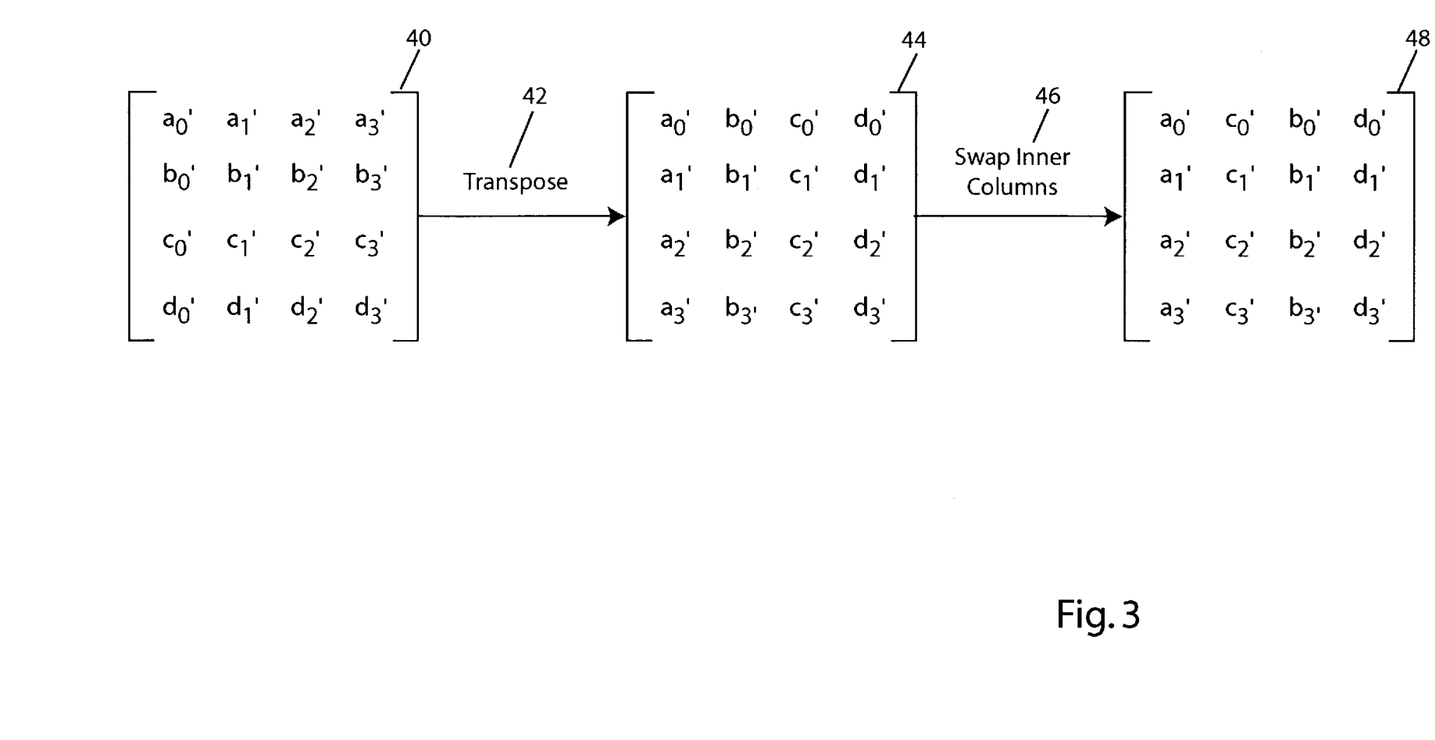
FIG. 3 illustrates a shuffling of elements useful in the processing loop of FIG. 2.

The sixteen complex outputs from the first loop 22 of four radix-4 butterflies are written back to memory in-place 36, but in a shuffled order 34. As illustrated in FIG. 3, the 16 complex input values corresponding to j, j+1, . . . j+3+3M can be represented as $a_0, a_1, a_2, a_3, b_0, b_1, b_2, b_3, c_0, c_1, c_2, c_3, d_0, d_1, d_2$, and $d_3$. Using this convention, the inputs to the first butterfly are $a_0, a_1, a_2$, and $a_3$; the inputs to the second butterfly are $b_0, b_1, b_2$, and $b_3$; and so on. The corresponding 16 complex outputs can be denominated as $a_0', a_1', a_2', a_3', b_0', b_1', b_2', b_3', c_0', c_1', c_2', c_3', d_0', d_1', d_2'$, and $d_3'$ and the output 40 can be represented in matrix form.

The shuffling can be illustrated, as shown in FIG. 3, as two matrix operations where the outputs, illustrated as matrix 40, are first transposed 42, or flipped about a diagonal through elements $a_0', b_1', c_2'$, and $d_3'$, as illustrated in intermediate matrix 44. In the second matrix operation step, the two internal columns are swapped 46 to result in final matrix 48. The 16 complex outputs are written to memory in the order of this final matrix 48. That is, output element $a_0'$ is written to the same location in memory that input element $a_0$ was retrieved from, output element $c_0'$ is written to the same location in memory that input element $a_1$ was retrieved from, output element $b_0'$ is written to the same location in memory that input element $a_2$ was retrieved from, and so on.

Using a four-fold SIMD processor, the shuffling can be implemented by performing modified 4×4 element transposition on the 16 real and 16 imaginary input values corresponding to a four butterfly set prior to performing the SIMD butterfly. Using the notation above, the real portion of the 16 input values can be loaded into vector registers (each having four floating point values) $v_0$ to $v_3$, and the imaginary portion in vector registers $v_4$ to $v_7$ as follows:

$v_0$: $(a_{0r}, a_{1r}, a_{2r}, a_{3r})$ $v_4$: $(a_{0i}, a_{1i}, a_{2i}, a_{3i})$
$v_1$: $(b_{0r}, b_{1r}, b_{2r}, b_{3r})$ $v_5$: $(b_{0i}, b_{1i}, b_{2i}, b_{3i})$
$v_2$: $(c_{0r}, c_{1r}, c_{2r}, c_{3r})$ $v_6$: $(c_{0i}, c_{1i}, c_{2i}, c_{3i})$
$v_3$: $(d_{0r}, d_{1r}, d_{2r}, d_{3r})$ $v_7$: $(d_{0i}, d_{1i}, d_{2i}, d_{3i})$

Performing the 4×4 transposition and swapping the middle columns produces:

$v_0$: $(a_{0r}, c_{0r}, b_{0r}, d_{0r})$ $v_4$: $(a_{0i}, c_{0i}, b_{0i}, d_{0i})$
$v_1$: $(a_{1r}, c_{1r}, b_{1r}, d_{1r})$ $v_5$: $(a_{1i}, c_{1i}, b_{1i}, d_{1i})$
$v_2$: $(a_{2r}, c_{2r}, b_{2r}, d_{2r})$ $v_6$: $(a_{2i}, c_{2i}, b_{2i}, d_{2i})$
$v_3$: $(a_{3r}, c_{3r}, b_{3r}, d_{3r})$ $v_7$: $(a_{3i}, c_{3i}, b_{3i}, d_{3i})$

Four butterflies can be performed on the SIMD processor using these vectors as inputs, and the corresponding outputs, which will now be in the correct order, can be stored to consecutive memory locations.

Referring again to FIG. 2, if after performing the four butterflies and shuffling the output and writing it to memory, more bit-reversal numbers remain in the lookup table, then the method loops 38 back and selects inputs 30, calculates butterflies 32, shuffles the output elements 34 and writes the outputs to memory 36 for another group of four butterflies based on the next value in the lookup table. For N=256 and using radix-4 butterflies, four loops of four butterflies will be calculated in the first loop 22. When all of the elements in the lookup table have been used, processing continues to the second loop 24 of the final stage 18.

Figure 4:
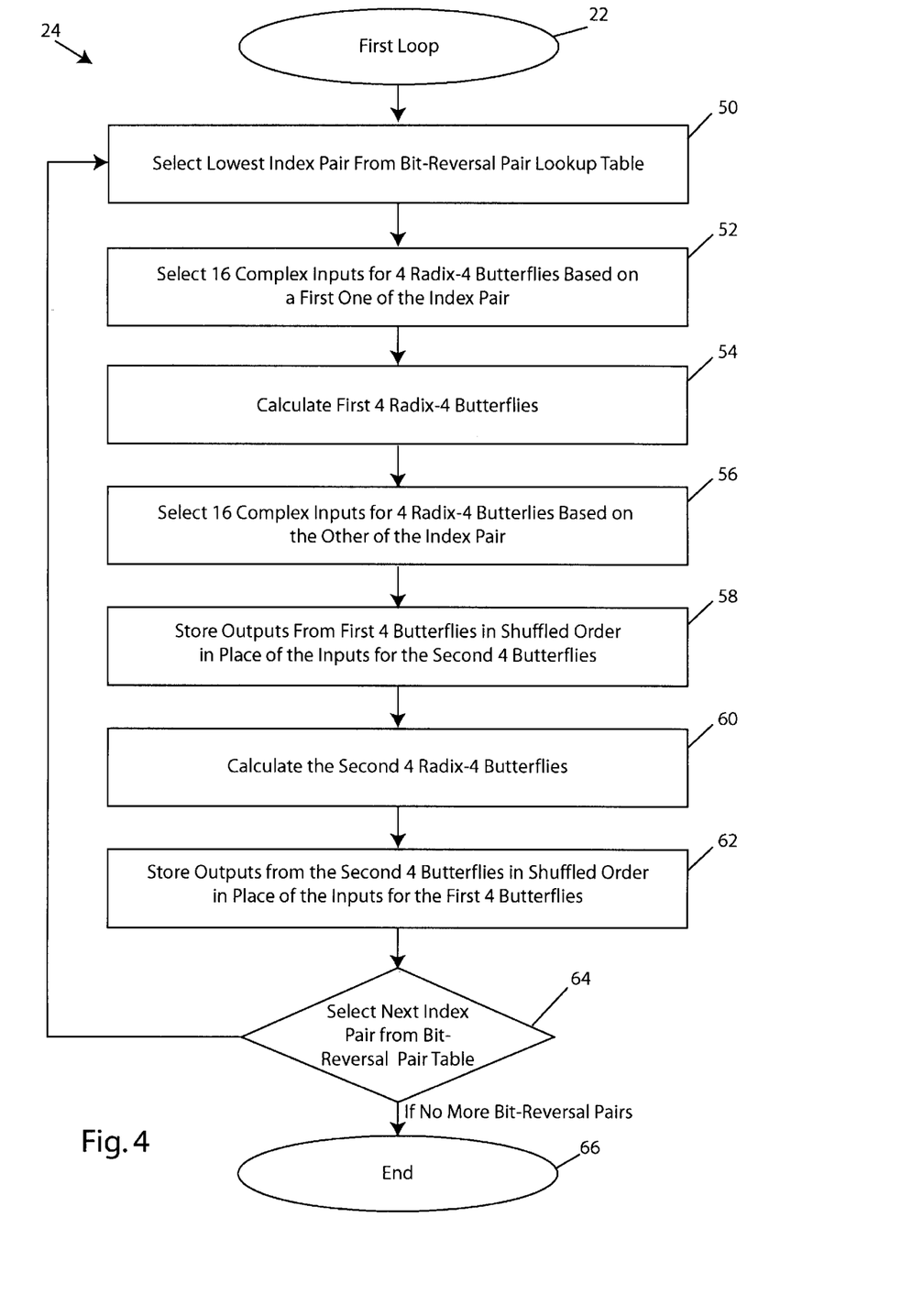
FIG. 4 is a flow chart for a second processing loop in a final calculation stage of the fast Fourier transform method of FIG. 1.

The second loop 24, illustrated in more detail in FIG. 4, has a number of steps similar to those in the first loop 22, however, the second loop performs eight radix-4 butterflies corresponding a pair of index values read from a bit-reversal pair lookup table during each pass of the loop. The bit-reversal pair table includes all of the pairs of values between 0 and N/16−1 that bit-reverse into each other—as opposed to the bit-reversal table used in the first loop 22 that contained values that bit-reversed into themselves. For example, for N=256, the table would contain the pairs: 1, 8; 2, 4; 3, 12; 5, 10; 7, 14; and 11, 13. Thus, for this example, the bit-reversal pair lookup table used for the second loop 24 includes six pairs of numbers between 0 and 15 that bit-reverse into each other. As one example, 3 (0011) bit-reverses to 12 (1100), so 3 and 12 form one bit-reversal pair in the bit-reversal pair lookup table. Because the bit-reversal pair table can always be arranged so that the first number in the first pair is unity, the first value in the table can be replaced with the number of index values contained in the table. For the example table described above, an N=256 bit-reversal pair lookup table could be stored as 12, 8; 2, 4; 3, 12; 5, 10; 7, 14; and 11, 13. In this way, the processing logic performing the second loop 24 could use 1 as the first value for selecting inputs to the first group of four butterflies, but would also know exactly how many values were contained in the bit-reversal pair lookup table and thus how many times the second loop would have to be executed to complete the second loop calculations. In addition, as with the first loop 22 bit-reversal table, it is the bit-reversal index value multiplied by four that will ultimately be used to select complex inputs for butterfly calculations, and the index values may either be stored as their actual bit-reversal pair values, or with these values multiplied by four.

The second loop 24 begins with the selection of the first index pair from the bit-reversal pair lookup table 50. Using the same scheme as for selecting 16 complex inputs 30 for four radix-4 butterflies in the first loop 22, the first index value from the index pair is used to select 16 complex inputs 52 for four radix-4 butterflies in the second loop 24. That is, the first index value is multiplied by four (if it is not stored multiplied by four), four consecutive elements are read from memory starting with this index value, and four consecutive elements are read from memory starting with index values that are M=N/4 elements apart. Using the example of the first index value from the first index pair from the bit-reversal pair lookup table being equal to one and N=256, the indices for the 16 complex inputs to the first group of four radix-4 butterflies are 4, 5, 6, 7, 68, 69, 70, 71, 132, 133, 134, 135, 196, 197, 198, and 199. The complex inputs are read from memory locations corresponding to these index values, and computation of the first group of four radix-4 butterflies 54 can begin.

The second index value of the index pair selected from the bit-reversal pair lookup table is then used to select 16 complex inputs 56 for a second group of four radix-4 butterflies. Using the same example from above, where the first index pair is 1, 8 (and thus the second index value is 8), the 16 indices used to read complex inputs from memory are 32, 33, 34, 35, 96, 97, 98, 99, 160, 161, 162, 163, 224, 225, 226, 227 and 228. The complex inputs are read from memory locations corresponding to these index values, and computation of the second group of four radix-4 butterflies 60 can begin.

The sixteen complex outputs from the first group of four radix-4 butterflies are stored, in an order shuffled from the inputs in the manner illustrated in FIG. 3, in place of the inputs for the second group of four radix-4 butterflies in memory 58. Similarly, the sixteen complex outputs from the second group of four radix-four butterflies are stored in shuffled order in memory in place of the sixteen complex inputs for the first group of four radix-4 butterflies 62. Temporary storage can be minimized in performing these reading, calculating and storing operations if the second sixteen element input set is loaded from memory 56 after the four butterflies have been calculated for the first group 54 of sixteen elements. The sixteen output elements from the first group of four butterflies can then be stored immediately to the memory locations corresponding to the sixteen input elements for the second group of four butterflies 58.

The second loop 24 continues until all of the bit-reversal pairs have been exhausted 64. Continuing with the N=256 example, the second loop 24 will iterate through 6 bit-reversal pairs, with each iteration performing two groups of four radix-4 butterflies, for a total of 48 butterflies performed in the second loop. As noted above, 16 butterfly calculations were performed in this example for the first loop 22, so, for the first and second loops combined, the required 64 radix-4 butterfly calculations for the final stage 18 have been performed, and the outputs have been written to memory in the required order so that a separate bit-reversal pass need not be performed and the FFT calculation may end 66.

The method of the invention can also benefit from storing the twiddle factors in a way that compliments the calculation of butterflies in the final stage of the FFT transform method of the invention. Typically, N/4 twiddle sets (each having four twiddle factors) are stored in a table in bit-reversed order (the bit-reversal being done on the indices of the twiddle sets from 0 to N/4−1). Each stage of the FFT uses more twiddle sets than are used in the prior stage. In the example used above, with N=256 and using radix-4 butterflies, each stage uses four times as many twiddle factors as the stage before. In the final stage of the FFT method of the invention, access to twiddle factors stored in the typical manner is effectively done in a random access way.

The twiddle factors can be ordered in memory, however, in a manner that allows them to be accessed much more efficiently during the final stage. The twiddle factors can be organized into groups of four sets of four factors, much like a 4×4 floating point matrix. These groups are then ordered in a bit-reversed order over indices of 0 to N/16−1. When the twiddle factors are ordered in this way, they are ordered so that the same indices that are used to select inputs for the four-fold SIMD radix-4 butterflies can also be used to select the twiddle factors from the table, simply by multiplying the index by 16 instead of by four. The group of twiddle factors can then be loaded consecutively into four SIMD registers (i.e., four floating point values into each of four vector registers).

In stages prior to the final stage, the same twiddle table can be accessed sequentially from its start in each stage. The next sequential twiddle set in this context is simply the next set of twiddle factors from the first column of twiddle factors in each 4×4 group. Alternatively, a second twiddle table may be provided for the stages prior to the final stage. The second twiddle table can be smaller, one fourth of the size of the table used for the final stage, and can be organized like a traditional bit-reversed twiddle table for a N/4 FFT.

The FFT method of the invention can be implemented in any manner in which its logic can practically be carried out. The method can be embodied in software that can run on a variety of computers known in the art, including without limitation, personal computers, workstation computers, and supercomputers known in the art. In one preferred embodiment, the FFT method of the invention is implemented in software and executed on a computer having one or more vector processors such as the PowerPC™ G4TM processor having AltiVec™ technology. An example of computer code useful for programming such a computer to carry out the method of the invention is included in U.S. Patent Application Serial No. 60/168,027, from which this application claims priority, and which is incorporated by reference into this disclosure. In addition, the logic of the FFT method of the invention can be implemented in a special purpose circuit, such as a circuit including ASICs having the specific logic employed herein deployed within the circuit, or in a system that combines such special purpose circuits with a general purpose computer with software.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A system for performing a fast Fourier transform on N ordered inputs in n stages comprising:
   a non-final stage calculating means for repetitively performing in-place butterfly calculations for n−1 stages;
   a final stage calculating means for performing a final stage of butterfly calculations including:
      a first loop means for performing a portion of the final stage butterfly calculations, the first loop means iterating on a table of first loop index values consisting of values that bit-reverse into themselves, the first loop means including control logic to select inputs for a set of butterfly calculations based on the first loop index values, performing the set of butterfly calculations, and storing butterfly calculation outputs in shuffled order in place of the selected inputs to result in a correct ordering of transform outputs; and a second loop means for performing a remaining portion of the final stage butterfly calculations, the second loop means iterating on a table of second loop index value pairs consisting of two values that bit-reverse into each other, the second loop means including control logic to select inputs for two sets of butterfly calculations based on the two second loop index pair values respectively, performing two sets of butterfly calculations, and storing butterfly calculation outputs from a first one of the two sets of butterfly calculations in shuffled order in place of the inputs selected for a second one of the two sets of butterfly calculations and storing butterfly calculation outputs from the second one of the two sets of butterfly calculations in shuffled order in place of the inputs selected for the first one of the two sets of butterfly calculations to result in a correct ordering of transform outputs.

2. The system of claim 1, wherein the final stage calculating means performs all butterfly calculations as radix-4 butterflies having four inputs and four outputs.

3. The system of claim 2, wherein N is a power of two.

4. The system of claim 3, wherein the non-final stage calculating means performs a first stage of radix-8 butterfly calculations followed by n−2 stages of radix-4 butterfly calculations.

5. The system of claim 3, wherein the first loop means iterates through a list of first loop index values between 0 and N/16−1 that bit reverse into themselves.

6. The system of claim 5, wherein the first loop means includes control logic for selecting four groups of four consecutive inputs for each first loop iteration, the inputs being selected by transforming the first loop index value into four input indices by multiplying the first loop index value by four and successively adding N/4 to result in four input indices, each group of four consecutive inputs being selected beginning with one input index, the four groups of four consecutive inputs being representable as a 4×4 matrix.

7. The system of claim 6, wherein the first loop means further includes control logic for performing four radix-4 butterfly calculations in each first loop iteration, one butterfly calculation being performed on each group of four consecutive inputs, the four radix-4 butterfly calculations generating four groups of four outputs, the outputs being representable as a 4×4 matrix.

8. The system of claim 7, wherein the first loop means further includes control logic to store the outputs in place of the inputs in shuffled order, the shuffled order resulting from a 4×4 matrix transposition and subsequent swapping of two inner columns.

9. The system of claim 8, wherein control logic of the first loop means shuffles the order of the four groups of four inputs to the radix-4 butterfly calculations so as to generate outputs in shuffled order.

10. The system of claim 8, wherein control logic of the first loop means shuffles the order of the four groups of four outputs from the radix-4 butterfly calculations before storing.

11. The system of claim 3, wherein the second loop means iterates through a list of second loop index value pairs between 0 and N/16−1 that bit reverse into each other.

12. The system of claim 11, wherein the second loop means includes control logic for selecting two sets of four groups of four consecutive inputs for each second loop iteration, the first set of inputs being selected by transforming a first value of a second loop index value pair into four input indices by multiplying the first value of the second loop index value pair by four and successively adding N/4 to result in four input indices, each group of four consecutive inputs in the first set of inputs being selected beginning with one input index, the four groups of four consecutive inputs in the first set being representable as a 4×4 matrix, the second set of inputs being selected by transforming a second value of the second loop index value pair into four input indices by multiplying the second value of the second loop index value pair by four and successively adding N/4 to result in four input indices, each group of four consecutive inputs in the second set of inputs being selected beginning with one input index, the four groups of four consecutive inputs in the second set being representable as a 4×4 matrix.

13. The system of claim 12, wherein the second loop means further includes control logic for performing two sets of four radix-4 butterfly calculations in each second loop iteration, one butterfly calculation being performed on each group of four consecutive inputs, the four radix-4 butterfly calculations generating two sets of four groups of four outputs, the outputs being representable as two 4×4 matrices.

14. The system of claim 13, wherein the second loop means further includes control logic to store the outputs of each set of four radix-4 butterfly calculations in place of the inputs to the other set of four radix-4 butterfly calculations in shuffled order, the shuffled order resulting from a 4×4 matrix transposition and subsequent swapping of two inner columns.

15. The system of claim 14, further comprising a twiddle factor storage element storing twiddle factors for application in the butterfly calculations, the twiddle factor storage element storing twiddle factors in groups of four, each group having an index and the groups being stored in bit reversed order based on the index.

16. The system of claim 2, wherein the non-final and final stage calculating means include a four-fold SIMD processor for performing four radix-4 butterfly calculations at a time.

17. In a system for calculating a fast Fourier transform on N ordered input elements having a plurality of calculation stages wherein N is a power of two, a method for performing a final calculation stage comprising:

performing a first iteration loop, the first iteration loop accepting input elements located using index values that bit-reverse into themselves, performing butterfly calculations on the inputs, and storing output elements in place of the input elements in a shuffled order, the shuffled order resulting in the output elements being ordered in the same manner as the input elements to the fast Fourier transform, the iteration loop iterating through all bit-reversal index values, performing a second iteration loop, the second iteration loop accepting input elements located using pairs of index values that bit-reverse into each other, performing a first set of butterfly calculations using input elements located using a first index value of a bit-reversal pair, performing a second set of butterfly calculations using input elements located using a second index value of a bit-reversal pair, storing output elements from the first set of butterfly calculations in place of the input elements to the second set of butterfly calculations in shuffled order and storing output elements from the second set of butterfly calculations in place of the input elements to the first set of butterfly calculations in shuffled order, the order of the storing resulting in the output elements being ordered in the same manner as the input elements to the fast Fourier transform, the iteration loop iterating through all bit-reversal pair index values.

18. The method of claim 17, wherein the final stage butterfly calculations are performed radix-4 butterflies having four inputs and four outputs.

19. The method of claim 18, wherein performing the first iteration loop includes iterating through a list of first loop index values between 0 and N/16−1 that bit reverse into themselves.

20. The method of claim 19, wherein performing the first iteration loop includes selecting four groups of four consecutive inputs for each first loop iteration, the inputs being selected by transforming the first loop index value into four input indices by multiplying the first loop index value by four and successively adding N/4 to result in four input indices, each group of four consecutive inputs being selected beginning with one input index, the four groups of four consecutive inputs being representable as a 4×4 matrix.

21. The method of claim 20, wherein performing the first iteration loop includes performing four radix-4 butterfly calculations in each first loop iteration, one butterfly calculation being performed on each group of four consecutive inputs, the four radix-4 butterfly calculations generating four groups of four outputs, the outputs being representable as a 4×4 matrix.

22. The method of claim 21, wherein performing the first iteration loop includes storing the outputs in place of the inputs in shuffled order, the shuffled order resulting from a 4×4 matrix transposition and subsequent swapping of two inner columns.

23. The method of claim 22, wherein performing the first iteration loop includes shuffling the order of the four groups of four inputs to the radix-4 butterfly calculations so as to generate outputs in shuffled order.

24. The method of claim 23, wherein performing the first iteration loop includes shuffling the order of the four groups of four outputs from the radix-4 butterfly calculations before storing.

25. The method of claim 18, wherein performing the second iteration loop includes iterating through a list of second loop index value pairs between 0 and N/16−1 that bit reverse into each other.

26. The method of claim 25, wherein performing the second iteration loop includes selecting two sets of four groups of four consecutive inputs for each second loop iteration, the first set of inputs being selected by transforming a first value of a second loop index value pair into four input indices by multiplying the first value of the second loop index value pair by four and successively adding N/4 to result in four input indices, each group of four consecutive inputs in the first set of inputs being selected beginning with one input index, the four groups of four consecutive inputs in the first set being representable as a 4×4 matrix, the second set of inputs being selected by transforming a second value of the second loop index value pair into four input indices by multiplying the second value of the second loop index value pair by four and successively adding N/4 to result in four input indices, each group of four consecutive inputs in the second set of inputs being selected beginning with one input index, the four groups of four consecutive inputs in the second set being representable as a 4×4 matrix.

27. The method of claim 26, performing the second iteration loop includes performing two sets of four radix-4 butterfly calculations in each second loop iteration, one butterfly calculation being performed on each group of four consecutive inputs, the four radix-4 butterfly calculations generating two sets of four groups of four outputs, the outputs being representable as two 4×4 matrices.

28. The method of claim 27, performing the second iteration loop includes storing the outputs of each set of four radix-4 butterfly calculations in place of the inputs to the other set of four radix-4 butterfly calculations in shuffled order, the shuffled order resulting from a 4×4 matrix transposition and subsequent swapping of two inner columns.

29. The method of claim 28, further comprising storing twiddle factors for application in the butterfly calculations, the twiddle factor storage element storing twiddle factors in groups of four, each group having an index and the groups being stored in bit reversed order based on the index.

30. The method of claim 18, wherein performing radix-4 butterfly calculations includes performing four radix-4 butterfly calculations at a time using a four-fold SIMD processor.

31. A computer program product for performing a final calculation stage in a system for calculating a fast Fourier transform on N ordered input elements having a plurality of calculation stages wherein N is a power of two, comprising:
a computer readable medium containing computer readable code for performing a first iteration loop, the first iteration loop accepting input elements located using index values that bit-reverse into themselves, performing butterfly calculations on the inputs, and storing output elements in place of the input elements in a shuffled order, the shuffled order resulting in the output elements being ordered in the same manner as the input elements to the fast Fourier transform, the iteration loop iterating through all bit-reversal index values,
a computer readable medium containing computer readable code performing a second iteration loop, the second iteration loop accepting input elements located using pairs of index values that bit-reverse into each other, performing a first set of butterfly calculations using input elements located using a first index value of a bit-reversal pair, performing a second set of butterfly calculations using input elements located using a second index value of a bit-reversal pair, storing output elements from the first set of butterfly calculations in place of the input elements to the second set of butterfly calculations in shuffled order and storing output elements from the second set of butterfly calculations in place of the input elements to the first set of butterfly calculations in shuffled order, the order of the storing resulting in the output elements being ordered in the same manner as the input elements to the fast Fourier transform, the iteration loop iterating through all bit-reversal pair index values.

32. The computer program product of claim 31, wherein the final stage butterfly calculations are performed radix-4 butterflies having four inputs and four outputs.

33. The computer program product of claim 32, wherein performing the first iteration loop includes iterating through a list of first loop index values between 0 and N/16−1 that bit reverse into themselves.

34. The computer program product of claim 33, wherein performing the first iteration loop includes selecting four groups of four consecutive inputs for each first loop iteration, the inputs being selected by transforming the first loop index value into four input indices by multiplying the first loop index value by four and successively adding N/4 to result in four input indices, each group of four consecutive inputs being selected beginning with one input index, the four groups of four consecutive inputs being representable as a 4×4 matrix.

35. The computer program product of claim 34, wherein performing the first iteration loop includes performing four radix-4 butterfly calculations in each first loop iteration, one butterfly calculation being performed on each group of four consecutive inputs, the four radix-4 butterfly calculations generating four groups of four outputs, the outputs being representable as a 4×4 matrix.

36. The computer program product of claim 35, wherein performing the first iteration loop includes storing the outputs in place of the inputs in shuffled order, the shuffled order resulting from a 4×4 matrix transposition and subsequent swapping of two inner columns.

37. The computer program product of claim 36, wherein performing the first iteration loop includes shuffling the order of the four groups of four inputs to the radix-4 butterfly calculations so as to generate outputs in shuffled order.

38. The computer program product of claim 37, wherein performing the first iteration loop includes shuffling the order of the four groups of four outputs from the radix-4 butterfly calculations before storing.

39. The computer program product of claim 38, wherein performing the second iteration loop includes iterating through a list of second loop index value pairs between 0 and N/16−1 that bit reverse into each other.

40. The computer program product of claim 39, wherein performing the second iteration loop includes selecting two sets of four groups of four consecutive inputs for each second loop iteration, the first set of inputs being selected by transforming a first value of a second loop index value pair into four input indices by multiplying the first value of the second loop index value pair by four and successively adding N/4 to result in four input indices, each group of four consecutive inputs in the first set of inputs being selected beginning with one input index, the four groups of four consecutive inputs in the first set being representable as a 4×4 matrix, the second set of inputs being selected by transforming a second value of the second loop index value pair into four input indices by multiplying the second value of the second loop index value pair by four and successively adding N/4 to result in four input indices, each group of four consecutive inputs in the second set of inputs being selected beginning with one input index, the four groups of four consecutive inputs in the second set being representable as a 4×4 matrix.

41. The computer program product of claim 40, performing the second iteration loop includes performing two sets of four radix-4 butterfly calculations in each second loop iteration, one butterfly calculation being performed on each group of four consecutive inputs, the four radix-4 butterfly calculations generating two sets of four groups of four outputs, the outputs being representable as two 4×4 matrices.

42. The computer program product of claim 41, performing the second iteration loop includes storing the outputs of each set of four radix-4 butterfly calculations in place of the inputs to the other set of four radix-4 butterfly calculations in shuffled order, the shuffled order resulting from a 4×4 matrix transposition and subsequent swapping of two inner columns.

43. The computer program product of claim 42, further comprising storing twiddle factors for application in the butterfly calculations, the twiddle factor storage element storing twiddle factors in groups of four, each group having an index and the groups being stored in bit reversed order based on the index.

44. The computer program product of claim 32, wherein performing radix-4 butterfly calculations includes performing four radix-4 butterfly calculations at a time using a four-fold SIMD processor.

45. A computer system for system for performing a fast Fourier transform on N ordered inputs in n stages comprising:
a four-fold SIMD processor;
a non-final stage calculating means for repetitively performing in-place butterfly calculations for n−1 stages, the butterfly calculations being perform in groups of four simultaneous butterflies on the four-fold SIMD processor;
a final stage calculating means for performing a final stage of butterfly calculations on the four-fold SIMD processor including:
a first loop means for performing a portion of the final stage butterfly calculations, the first loop means iterating on a table of first loop index values consisting of values that bit-reverse into themselves, the first loop means including control logic to select inputs for four simultaneous radix-4 butterfly calculations based on the first loop index values, performing the four simultaneous radix-4 butterfly calculations, and storing butterfly calculation outputs in shuffled order in place of the selected inputs to result in a correct ordering of transform outputs; and
a second loop means for performing a remaining portion of the final stage butterfly calculations, the second loop means iterating on a table of second loop index value pairs consisting of two values that bit-reverse into each other, the second loop means including control logic to select inputs for two sets of four simultaneous radix-4 butterfly calculations based on the two second loop index pair values respectively, performing the two sets of four simultaneous radix-4 butterfly calculations, and storing butterfly calculation outputs from a first one of the two sets of butterfly calculations in shuffled order in place of the inputs selected for a second one of the two sets of butterfly calculations and storing butterfly calculation outputs from the second one of the two groups of butterfly calculations in shuffled order in place of the inputs selected for the first one of the two groups of butterfly calculations to result in a correct ordering of transform outputs.

46. A method for calculating a fast Fourier transform comprising:
accessing an ordered set of N transform inputs;
performing one or more non-final stages of butterfly calculations, each of the one or more stages accepting N inputs and transforming them into stage outputs and storing the outputs in place of the outputs in a bit-reversed order;
performing a final stage of butterfly calculations using the outputs of a previous stage of butterfly calculations as inputs to the final stage of butterfly calculations, the final stage of butterfly calculations including:
(a) a first loop iterated through a list of first loop index values between 0 and N/16−1 that bit reverse into themselves, the first loop including:
(i) selecting four groups of four consecutive inputs, the inputs being selected by transforming the first loop index value into four input indices by multiplying the first loop index value by four and successively adding N/4 to result in four input indices, each group of four consecutive inputs being selected beginning with one input index, the four groups of four consecutive inputs being representable as a 4×4 matrix;

(ii) performing four radix-4 butterfly calculations, one calculation for each group of four inputs; and (iii) storing the outputs in place of the inputs in shuffled order, the shuffled order resulting from a 4×4 matrix transposition and subsequent swapping of two inner columns; and (b) a second loop iterated through a list of second loop index pair values, the second loop index pair values being each pair of values between 0 and N/16−1 that bit reverse into each other, the including loop including:

(i) selecting two sets of four groups of four consecutive inputs, the inputs being selected by transforming each value in the second loop index pair into four input indices by multiplying each second loop index pair value by four and successively adding N/4 to result in two sets of four input indices, each group of four consecutive inputs being selected beginning with one input index, the two sets of four groups of four consecutive inputs being representable as two 4×4 matrices;

(ii) performing two sets of four radix-4 butterfly calculations, one calculation for each group of four inputs; and (iii) storing the outputs of each set of four radix-4 butterfly calculations in place of the inputs to the other set of four radix-4 butterfly calculations in shuffled order, the shuffled order resulting from a 4×4 matrix transposition and subsequent swapping of two inner columns;

wherein following the second loop, outputs from the fast Fourier transform are correctly ordered.

* * * * *